United States Patent [19]
Miller

[11] 3,961,932
[45] June 8, 1976

[54] PROCESS FOR COATING GRANULAR FERTILIZERS WITH CHELATED MICRONUTRIENTS

[75] Inventor: Ralph Miller, Pleasantville, N.Y.

[73] Assignee: Ciba-Geigy Corporation, Ardsley, N.Y.

[22] Filed: July 22, 1974

[21] Appl. No.: 490,825

Related U.S. Application Data

[63] Continuation of Ser. No. 431,527, Jan. 7, 1974, abandoned, which is a continuation of Ser. No. 224,986, Feb. 9, 1972, abandoned.

[52] U.S. Cl. .................................. 71/1; 71/64 E; 71/DIG. 2
[51] Int. Cl.² ........................................ C05G 3/00
[58] Field of Search .................. 71/1, DIG. 2, 64 E

[56] References Cited
UNITED STATES PATENTS

| | | | |
|---|---|---|---|
| 2,931,716 | 4/1960 | Kelley et al. | 71/DIG. 2 |
| 3,520,651 | 7/1970 | Philen et al. | 71/1 X |
| 3,852,055 | 12/1974 | Hawkes et al. | 71/64 E X |

*Primary Examiner*—Frank A. Spear, Jr.
*Assistant Examiner*—Ferris H. Lander
*Attorney, Agent, or Firm*—Harry Falber

[57] ABSTRACT

A process for uniformly coating granular fertilizer formulations with one or more chelated metallic micronutrients which comprises the following steps: blending a granular fertilizer formulation in, for instance, a rotary drum mixer; spraying, while the blending continues 1 to 5% by weight of an aqueous solution or slurry containing one or more chelated metallic micronutrients, as for example, $Na_2Zn$ EDTA, onto said fertilizer formulation; and adding, before or after said spraying, and while the blending continues 1 to 4% by weight of a finely divided water-absorbent additive, such as, a synthetic calcium silicate or finely divided silica, to the fertilizer formulation. The finished fertilizer formulation then contains 0.05 to 0.5% by weight of micronutrient.

3 Claims, No Drawings

3,961,932

PROCESS FOR COATING GRANULAR FERTILIZERS WITH CHELATED MICRONUTRIENTS

This is a continuation of application Ser. No. 431,527, filed on Jan. 7, 1974, now abandoned which, in turn, is a continuation of application Ser. No. 224,986, filed on Feb. 9, 1972, now abandoned.

FIELD OF THE INVENTION

The present invention relates to the production of fertilizers containing micronutrients. More particularly, this invention pertains to a novel process for coating granular fertilizer formulations uniformly with one or more chelated metallic micronutrients.

BACKGROUND OF THE INVENTION

Farmers strive constantly to increase their yields and the quality of their crops, and at the same time reduce their unit cost of production. They take advantage of the latest technology available to them, such as, new varieties, new production methods, agricultural chemicals, new farm machinery, etc. They recognize the importance of the need for adequate plant nutrition, which not only includes the macronutrients, nitrogen, phosphorus and potassium, but also micronutrients.

While the term "micronutrients" is generally considered to refer to such elements or metals as boron copper, iron, manganese, molybdenum and zinc, it covers in the context of this invention particularly the metals copper, iron, manganese and zinc, that is, those micronutrient elements which when added to the soil in inorganic form tend to react with other soil components and form insoluble compounds which makes them unavailable to the growing crops; or they react with the macronutrient fertilizers, especially with phosphate-based fertilizers, to form complexes or compounds which subsequently makes them likewise unavailable to crops.

Surveys over the last decade have reported deficiencies of micronutrients in many states on one or more crops. For example, deficiencies have been observed in at least 14 states for copper, 43 for zinc, 25 for iron, and 30 for manganese. Actually, micronutrient deficiencies may exist in many other states on various crops. One can, therefore, expect that micronutrient problems will increase with continued cropping and the problems will become more acute as crop yields per acre increase.

Micronutrient elements are now being used as a tool in maintaining the productivity of our agricultural soils and in increasing the yield and quality of crops grown on them. In many cases micronutrients are not only being used to correct known deficiencies but they are also being used in programs for the maintenance of soil fertility.

Micronutrients can be applied alone as a direct soil application, as a foliar spray, or in combination with macronutrient fertilizers. It is generally accepted that it is important to prevent or correct as early as possible micronutrient shortages in crops in order to assure top yields and quality. Therefore, where previous history indicates a tendency towards a particular deficiency, correction or prevention is best accomplished through a combined application of micronutrients and macronutrients. There are obvious agronomic and economic benefits to the combined application.

PRIOR ART PRACTICES

There are a number of ways micronutrients have been added to granular fertilizers. In particular, the following techniques have been employed: dry blending, incorporation during the granulation process and coating onto the surface of the finished fertilizer granule.

With respect to dry blending of granular micronutrients with granular fertilizers the problem of segregation is one of the main disadvantages. Particular size matching of the granular micronutrient, and to a lesser extent bulk density matching with the granular fertilizer is very important if segregation is to be minimized. Also, when granular micronutrients are used there usually are relatively few particles of the micronutrient present in a ton of a finished granular fertilizer in comparison with the number of macronutrient particles. This results in a sparsity of the number of micronutrient granules per unit of area in the field and the best uptake of the micronutrient by the growing crop may not be achieved.

The main disadvantage of adding micronutrients during the manufacturing process which otherwise would be a very good method to achieve uniformity and distribution, is the inventory and storage problem. It is economically not feasible to make and store small lots of varius grades of fertilizer containing different proportions or micronutrients. Besides as regards the use of chelated micronutrients it is possible to utilize them only if the fertilizer is made by the ammoniation granulation process and if it is added to the ammoniating fluid. The problem with the use of chelated micronutrients in the fertilizer granulation process is that they tend to decompose under acid conditions and at elevated temperatures and appreciable amounts are lost.

Thus, the technique of coating granular fertilizers with micronutrients would offer most flexibility to the fertilizer manufacture if he had a simple, economical method for producing relatively small batches of granular fertilizer formulations containing micronutrients wherein most of the individual granules contained the desired amount of micronutrients. If such a technique were available, fertilizers could be coated with the required micronutrient on a prescription basis for the customer at or near the time of shipment which avoids the problem of storage and inventory. With proper application of the micronutrient as a coating on the granular fertilizer, the problem of segregation would be eliminated. Also, the micronutrient sites unit area in the field would be large because each macronutrient granule also has micronutrient coated on it.

Apart from, for example, methods patented by the Tennessee Valley Authority involving coating of granules of hygroscopic fertilizer salts with micronutrient powders which when wetted with water and/or steam, react with the fertilizer constituents to form in situ stable fertilizer/micronutrient commpounds or complexes (cf. U.S. Pat. Nos. 3,523,019; 3,423,199; 3,520,651), prior art coating techniques generally involve, in order to produce adhesion of the powdered micronutrients to the granular fertilizer and prevent their segregation, the use of such conventional binders as e.g., motor oil and diesel oil or such binders as water-soluble fertilizers as covered by U.S. Pat. No. 3,353,949.

All of these practices have drawbacks, e.g., oil cannot be used as a binder with ammonium nitrate or mixed fertilizers that contain large amounts of ammonium nitrate because of the hazard of increased detonation sensitivity. Oil also seeps through bags and weakens them. Furthermore, these prior art procedures were primarily directed to utilizing powdered inorganic micronutrients and in none of them have chelated micronutrients, in general, and chelated micronutrients in liquid form, in particular, been described. As is well-known and as has been pointed out above chelated micronutrients cannot easily be blended with fertilizers; also it is generally believed that it is not economical to do so. However, among the micronutrient products which are commercially available and which are agronomically particularly effective in supplying the elements copper, iron, manganese and zinc to growing crops are chelated metallic micronutrients containing these elements. The use of these products in fertilizer mixtures can be economical, given a simple and effective coating technique such as is described hereinbelow since they are agronomically very effective and relatively small amounts are needed. In fact, given such a simple and effective coating method, the chelated micronutrient products enumerated below are particularly advantageous in comparison to inorganic micronutrients because they do not react with phosphatebased fertilizers or other soil components, have in general very good solubility characteristics, supply the micronutrient element within a wide soil pH range, are in general easy to handle and mix and, most importantly, have an efficiency advantage over inorganic micronutrients in terms of crop response and dosage rates.

It is therefore an object of this invention to provide simple, effective and economical methods of coating chelated micronutrients onto granular fertilizers. Other objects and advantages will become apparent from the ensuing disclosure.

DETAILED DISCLOSURE

According to the concept of this invention there are thus provided simple, effective and economical methods for coating granular fertilizer formulations uniformly and evenly with one or more chelated metallic micronutrients by spraying such chelated micronutrients in liquid or slurry form onto granular fertilizer formulations while they are being blended in a suitable mixer before, during or after a finely divided, water-absorbing powder additive is charged to the blend with the blending being continued during such charge.

According to the methods of this invention, any of the three main types of granular fertilizer formulations in commercial use can be coated with chelated micronutrients. For instance, individual granular fertilizer materials such as granular potash, concentrated superphosphate, ammonium nitrate, urea, ammonium sulfate, diammonium phosphate, etc.; bulk blended granular fertilizer wherein, for instance, potash, phosphate and nitrate granules have been physically mixed; and ammoniated granular fertilizers wherein each granule contains various fertilizer substances. As illustrated in the examples any of the conventional NPK fertilizers or macronutrients commonly referred to as 10-30-10, 16-16-16, 13-13-13, 0-46-0, 21-0-0, 35.5-0-0, 0-0-60, 18-46-0, etc., can be employed. (In these designations, the first number refers to the number of units (20 pounds) of nitrogen, the second number to the units of $P_2O_5$ and the third number to the units of $K_2O$ in a ton.)

The chelated micronutrients with the micronutrient being copper, iron, manganese or zinc which are useful in the practice of this invention, are derived from synthetic amino acid chelating agents. In particular, the following chelates can conveniently be used: disodium zinc ethylenediaminetetraacetate ($Na_2Zn$ EDTA), disodium manganous ethylenediaminetetraacetate ($Na_2Mn$ EDTA), disodium cupric ethylenediaminetetraacetate ($Na_2Cu$ EDTA), monosodium ferric ethylenediaminetetraacetate (NaFe EDTA), and the corresponding potassium salts thereof, as well as similar or analogous chelates based on nitrilotriacetic acid (NTA), hydroxyethylenediaminetriacetic acid (HOEDTA), diethylenetriaminepentaacetic acid (DTPA), 1,2-diaminocyclohexanetetraacetic acid (DCTA), ethylenediamine di-(o-hydroxyphenylacetic acid) (EDDHA), ethyleneglycol bis-(aminoethylether) tetraacetic acid, dihydroxyethyl glycine (DHEG), etc.

The amount of micronutrient which is employed is very small in relation to the granular fertilizer formulation. Thus, in the finished coated granular fertilizer formulation only 0.05 to 0.5% is metal micronutrient.

The chelated micronutrient is applied as an aqueous solution or as a low viscosity aqueous slurry at the rate of about 1 to 5% by weight. The use of a water solution or aqueous slurry of the chelated micronutrient materially aids in producing a granular fertilizer product which contains the micronutrient uniformly distributed on the granules without requiring sophisticated equipment. In addition, this procedure can be practiced with modest quantities of fertilizer formulations at very small unit operating costs.

Some of the more important chelated metallic micronutrients, such as $Na_2ZnEDTA$, $Na_2MnEDTA$ and $Na_2CuEDTA$ are quite soluble in water. Solutions containing about 40% dissolved solids at ambient temperatures are formed. Moreover solutions of about this concentration are marketed in commercial quantities. Other chelated metallic micronutrients which are also important, such as, NaFeEDTA or NaFeEDDHA are less soluble in water. However, it has been found that sprayable slurries can be prepared consisting of water and finely divided chelated micronutrients. Sprayable slurries are easily prepared which contain more than 40% of total solids. These slurries can be sprayed onto a tumbling mass of bulk fertilizer granules as readily as though the solids were all dissolved. These dispersions can be prepared by any of the well-known methods. The solids can be dry-ground and then added to the water with good agitation or a mixture of solids and water can be wet-milled. As long as the bulk of the solids in the dispersion is below about 150 mesh when the sprayable slurry is added to the tumbling bulk fertilizer granules, the micronutrient will be uniformly distributed in the final granular fertilizer product.

It will be appreciated that because the metallic micronutrient is in chelated form, it does not react to any appreciable extent with any of the bulk fertilizer components or with the finely divided water-absorbent powder additives.

Frequently, it is desirable to prepare granular fertilizer formulations supplemented with more than one of the chelated micronutrients. To make products of this kind with a relatively high chelated micronutrient content, e.g., a product containing 0.2% iron in the form of NaFeEDTA plus 0.2% zinc in the form of Na$_2$ZnEDTA, it is useful to prepare a sprayable slurry or dispersion in which the liquid phase is a concentrated aqueous solution of the zinc chelate and most of the iron chelate is finely divided solid. This slurry is sprayed onto the tumbling solids in the micronutrient addition step of the process.

To overcome the detrimental effect of the added moisture an appropriate quantity of finely divided water-absorbing powder additive is also used. Generally, about 1 to 2% and preferably 1 to 4% of the additive is employed to insure that the final formulation can be distributed on the soil without any application problems.

A variety of finely divided, water-absorbent powders can be used to insure that the final product will have good physical application properties. Examples are such water-insoluble substances as, e.g., powdered synthetic calcium silicates, such as, the MICRO-CEL products; finely divided silica as exemplified by the well-known HI-SIL 233 and ZEOSYL products; finely divided absorbent attapulgite clays, such as, ATTACOTE and ATTAGEL 150 products; finely divided vermiculite, powdered bentonite and diatomaceous earth. The water-absorbent powders can also be water-soluble substances, such as, finely divided anhydrous sodium sulfate, trisodium phosphate, monohydrate powdered calcium chloride, monohydrate powdered magnesium sulfate, alum and the like. These materials all form hydrates containing six or more moles of water per mole of salt.

The selection of the water absorbent powder used to insure good application properties of the final product is usually determined by cost comparisons of suitable alternative materials while keeping in mind the amount of water used in the micronutrient addition step. When a relatively small amount of water is used, the water absorbency of the powdered component of the formulation is relatively unimportant. For example, when the added water is only about 1% of the final product, then such readily available powdered materials as building plaster or even finely divided portland cement can be used. Under the circumstances, any finely divided fertilizer material such as urea or potassium chloride can be employed. As the water content approaches 2%, it is desirable to use a powdered additive with more pronounced water absorbency properties.

As pointed out above, the micronutrient-containing granular fertilizer compositions are prepared according to the concept of this invention by spraying chelated micronutrients in liquid form onto the fertilizer formulation before or after adding the finely divided water-absorbent powder additive while the fertilizer formulation is being mixed or blended in suitable equipment.

As suitable equipment a variety of mixers or blenders can be employed, such as Munson blenders, Double-Cone mixers, Twin-Shell blenders, Marion mixers, Rotary blenders, Nauta blenders, in fact, any type of blender which effectively blends without causing any appreciable fracturing or attrition of the fertilizer granules.

The best type of mixer for coating is the rotary drum mixer. This type mixer is widely used by bulk blenders. Modified cement type mixers are essentially fertilizer rotary drum mixers, and they also work quite well. Ribbon-type mixers can be used, however, they usually do not turn the fertilizer over fast enough so that coating can be accomplished in a relatively short period of time. A longer mixing cycle is required than with a rotary drum mixer.

To carry out micronutrient coating in a rotary drum mixer there is required as additional equipment a pump, a sparger fitted with spray nozzles, a shut-off valve, and a pressure gauge. The pump should be of a type suitable for handling liquid fertilizer materials. Its capacity requirements are usually relatively low, 3–5 gpm delivery at 25–30 psi at the nozzles. Usually spare pumps for use on other plant equipment or spreading equipment are quite satisfactory for use in this application.

The sparger can be made from ¾ or 1 inch pipe and, fitted with the proper number of nozzles. The number of nozzles required depends on the length of the sparger pipe which must extend almost the entire depth of the mixer. The best placement of the pipe is along, or near, the axis of rotation of the mixer. The nozzles should be flat spray type for liquid fertilizers. Strainers in the system are not necessary. The nozzle size should be chosen so that the spray cycle takes about 1 minute. This, of course, depends upon the number of nozzles, operating pressure, and the gallons of fluid to be pumped. In the drum mixer the nozzles should be directed to spray on to the falling curtain of fertilizer granules, not on the metal sides or ends of the mixer. This placement prevents the drum walls from becoming wet with the liquid chelate and becomming caked with fertilizer materials. Also, this placement assures good coating and adhesion.

One of the coating procedures as carried out in practice can be described in greater detail as involving the following steps. The mixer is charged with the granular fertilizer formulation and the mixer is turned on so that the solids are blended together until they are uniformly mixed. As soon as the solids have been mixed and while the mixing is continuing, the aqueous chelated micronutrient solution or slurry is sprayed onto the tumbling solids. The mixing and rate of spraying is coordinated so that the liquid phase is uniformly distributed over the solid particles. After completing the spray cycle which lasts usually a minute, the mixing is continued for another 1 or 2 minutes while the powdered water-absorbent additive is added. It is necessary to add this powder substance as a drying or conditioning agent since in many instances the water added to the moving solids is close to 2% of the final mix, that is, about 40 pounds per ton. Under most conditions the addition of about 40 pounds of water to a ton of fertilizer will cause it to become sufficiently moist so that the granular particles will tend to stick together. If left in this condition the fertilizer will set up. If handled, the moist particles will smear and will no longer flow freely. In this state they cannot be properly distributed on the soil by any of the fertilizer applicators which are available, hence the addition of finely divided water-absorbent powders.

Should it be necessary to use as much as about 2.5% water or more, it is advisable to make the product in two cycles. That is, a portion of the micronutrient-containing solution or slurry is added to the bulk fertilizer granules followed by an appropriate amount of the powdered additive. Then an additional portion or the remainder of the micronutrient-containing solution is added to the bulk solids followed by more of the powdered additive and so on.

It has been convenient to describe the coating procedure of this invention in greater detail as a step by step operation wherein the addition of the chelated micronutrient takes place first and is followed by the addition of the powdered additive. Actually, it has been found possible to reverse the order of addition between the solution or slurry and absorbent powder. In this process variation, the mixer is charged with the fertilizer formulation and the powdered additive, it is then turned on and after a mixing cycle of one or a few minutes the chelated micronutrient solution or slurry is sprayed onto the tumbling solids for a period of one or several minutes. The mixing is then continued for another minute or several minutes. Furthermore, it is also possible to add the aqueous preparation and powder at the same time. Consequently, the order of addition is not critical. The preferred operating procedure is decided upon after running a few preliminary trials with the equipment on hand and the components to be used in the formulation.

It has been pointed out above that one of the advantages of this invention is that it can be used economically on small quantities of fertilizer formulations using simple equipment. Although the process has been described as a batch operation, it can be carried out continuously. This requires continuous mixers served by readily adjustable continuous solids feeders and pumps tied together by a proportional feed control system. Such a system insures that the ratios of the feed rates of the components of the formulation are maintained at predetermined values.

The following examples illustrate, but are not intended to limit the invention.

EXAMPLE 1

To a rotary (cement mixer type) blender equipped with two spray nozzles located to spray onto the mixer contents and to avoid having the spray reach the mixer walls, 1912.5 pounds of 13-13-13 complex granular fertilizer was added. While the blender was rotating 67.5 pounds of $Na_2ZnEDTA$ solution containing 6% of the chelated zinc was sprayed onto the moving solids. This addition was completed in about 1 minute. After all of the solution had been sprayed onto the moving solids, mixing was continued for about an additional minute. Then, while the mixing was continued, 20 pounds of MICRO-CEL was dumped into the mixer. Mixing was continued for about 3 minutes after all the MICRO-CEL had been added. At the end of this period the mixer was emptied. On analysis, it was found that there was less than a 10% difference between the chelated zinc content of random samples taken from the final product. The final product was dry but not dusty.

EXAMPLE 2

To a mixer such as described in Example 1 the following granular bulk fertilizers were charged:

| | Granular Component | Pounds |
|---|---|---|
| 21% N | Ammonium Sulfate | 360 |
| 33.5% N | Ammonium Nitrate | 554 |
| 46% $P_2O_5$ | Concentrated Superphosphate | 564 |
| 60% $K_2O$ | Potassium Chloride | 434 |
| | Total | 1912 |

The bulk components were blended together for about 2 minutes. While the blending was continuing, 68 pounds of $Na_2ZnEDTA$ solution containing 6% chelated zinc was sprayed onto the moving solids. The addition required about 1 minute. Mixing continued for an additional minute. Then, without stopping the mixing, 20 pounds of HI-SIL 233, a finely divided precipitated silica, was added to the mixer. The mixing was continued for an additional 3 minutes to produce a 0.2% chelated zinc-containing granular 13-13-13 blended fertilizer.

EXAMPLE 3

In a manner analogous to that described in Example 2 a granular manganese-containing fertilizer formulation was prepared from the following components:

| | | |
|---|---|---|
| 13-13-13 granular fertilizer | 95.0 | wt. % |
| $Na_2Mn$ EDTA solution (5% metal) | 4.0 | '' |
| micro-CEL E | 1.0 | '' |
| Total | 100.0 | '' |

The mixing cycles for the liquid chelate and the powdered additive were 5 minutes each.

EXAMPLE 4

A laboratory PKU blender and a pilot plant Munson mini-mixer (cement mixer) were employed to simulate the rotary mixers now in use by fertilizer formulators. Two types of granular fertilizer (13-13-13) with different particle size distributions were used. The fertilizer (95 parts by weight) was placed in the blender or mixer and 4 parts by weight of micronutrient slurry (NaFe EDTA and NaFE DTPA which were ground in a micro pulverizer, 99.9% passing 325 mesh sieve prior to make-up of the slurry — slurry was made up from 15.15 pounds of ground chelate and 24.85 pounds of water per 1000 pounds batch) sprayed within 3 minutes upon it while blending. An additional 5 minutes of blending took place to obtain uniform coverage of the slurry on the fertilizer. 1 part by weight of finely divided MICRO-CEL A was added in two equal portions and the material blended for 5–10 minutes each to remove excess surface moisture. The free flowing granules contained little or no loose dust and appeared from laboratory analysis to be uniformly impregnated with micronutrients.

EXAMPLE 5

One ton of 10-30-10 blend granular fertilizer and 3% diatomaceous earth were mixed together in a rotary drum mixer for one minute and then 6.2 gal. of liquid $NA_2Zn$ EDTA (6% Zn) was sprayed in over a 1-minute period. Mixing was then continued for one more minute. This technique worked very well and the final fertilizer formulation was dry and of satisfactory adherence. After 24 hours it was dry and had good flowability.

EXAMPLE 6

One ton of 10-30-10 blend granular fertilizer, 6.2 gal. of liquid $Na_2Zn$ EDTA (6% Zn) and 4% diatomaceous earth were mixed as in Example 4 and results were like those in Example 4.

EXAMPLE 7

One ton of 10-30-10 blend granular fertilizer, 6.2 gal. liquid $Na_2Zn$ EDTA (6% Zn) and 2% MICRO-CEL E were used as in Example 4 with the results described in Example 4.

EXAMPLE 8

One ton of 10-30-10 blend granular fertilizer, 6.2 gal. liquid $Na_2Zn$ EDTA (6% Zn) and 3% ATTACOTE were mixed as in Example 4 with the results given in Example 4.

EXAMPLE 9

One ton of 10-30-10 blend granular fertilizer, 6.2 gal. liquid $Na_2Zn$ EDTA (6% Zn) and 3% ATTAGEL 150 were mixed as in Example 4 with results nearly as good as those of Example 4.

What is claimed is:

1. A process for producing a substantially dust-free chelated metallic micronutrient impregnated granular fertilizer consisting essentially of blending a granular fertilizer formulation and while the blending is continuing, spraying about 1 to 5% by weight of a concentrated aqueous solution of a chelated metallic micronutrient selected from the group consisting of complexes of synthetic amino acid chelating agents with zinc, copper or manganese metals onto the moving solids to uniformly impregnate the solid granules with said solution, the chelated metallic micronutrient in said solution being non-reactive with any component of the granular fertilizer formulation, and without removing any water and while the blending is continuing adding from about 1 to 4% by weight of a finely divided, water absorbent powder to overcome the detrimental effect of the added water and continuing the blending until said substantially dust-free chelated metallic micronutrient impregnated granular fertilizer formulation is formed, said formulation containing from about 0.05 to 0.5% by weight of micronutrient.

2. The process according to claim 1 wherein said aqueous solution is sprayed onto the granular fertilizer formulation prior to the addition of the finely divided, water-absorbent powder additive.

3. The process according to claim 1 wherein said aqueous solution is sprayed onto the granular fertilizer formulation after the addition of the finely divided, water-absorbent additive.

* * * * *